United States Patent
Tsai

(10) Patent No.: US 6,736,672 B1
(45) Date of Patent: May 18, 2004

(54) STACKED CARD CONNECTOR HAVING TWO ROWS OF TERMINALS EXTENDING OUT OF A BOTTOM SURFACE OF THE CONNECTOR AT A SIDE OPPOSITE TO AN INSERT PORT

(76) Inventor: Chou Hsuan Tsai, 15F, No. 4, Lane 127, Sec. 1, Fu-Hsing Rd., Hsin-Chuang City, Taipei Hsien (TW)

( * ) Notice: Subject to any disclaimer, the term of this patent is extended or adjusted under 35 U.S.C. 154(b) by 0 days.

(21) Appl. No.: 10/292,984

(22) Filed: Nov. 12, 2002

(51) Int. Cl.[7] .......................... H01R 13/60; H01R 24/00
(52) U.S. Cl. ..................... 439/541.5; 439/631
(58) Field of Search .............................. 439/541.5, 630, 439/631, 637, 638

(56) References Cited

U.S. PATENT DOCUMENTS

| | | | | |
|---|---|---|---|---|
| 6,179,652 B1 | * | 1/2001 | Tung et al. | 439/541.5 |
| 6,231,399 B1 | * | 5/2001 | Meng | 439/701 |
| 6,299,455 B1 | * | 10/2001 | Dong | 439/59 |
| 6,390,832 B1 | * | 5/2002 | Kuo | 439/101 |

* cited by examiner

*Primary Examiner*—Chandrika Prasad
(74) *Attorney, Agent, or Firm*—Pro-Techtor International Services

(57) ABSTRACT

A stacked card connector includes a base, a row of first terminals, a row of second rear terminals, and a row of second front terminals. The base is formed with a first slot and a second slot for receiving a first card and a second card which are inserted into the slots along the same direction. The first and second terminals are located in the first and second slots to contact the first and second cards, respectively. The second terminals have arced contacts flush with each other, pins extending out of a bottom surface of the base from a side opposite to an insert port of the second slot, and extensions connecting the contacts to the pins, respectively.

5 Claims, 3 Drawing Sheets

STACKED CARD CONNECTOR HAVING TWO ROWS OF TERMINALS EXTENDING OUT OF A BOTTOM SURFACE OF THE CONNECTOR AT A SIDE OPPOSITE TO AN INSERT PORT

BACKGROUND OF THE INVENTION

1. Field of the Invention

The invention relates to an electric connector, and in particular to a stacked card connector connecting to an electric card.

2. Description of the Related Art

Referring to FIG. 1, a conventional double-layerd and stacked card connector is used for an electric card, such as a telephone card or an ATM card, to be inserted into. The card connector includes a lower base 10, an upper base 15, two rows of spaced first terminals 25, two rows of spaced second terminals 30, and a circuit board 20.

The lower base 10 is formed with a first slot 11 for receiving an electric card, and the first slot 11 has an insert port 12. The upper base 15 is stacked above the lower base 10 and formed with a second slot 16 for receiving another electric card, and the second slot 16 has an insert port 17.

Each first terminal 25 has a contact 26, an extension 27 and a pin 28. The contacts 26 are in the shapes of convex arcs facing upward, positioned within the first slot 11, and well aligned. The pins 28 extend out of the bottom surface of the lower base 10 from a first side near the insert port 12 and a second side opposite to the insert port 12, respectively.

Each second terminal 30 has a contact 31, an extension 32 and a pin 33. The contacts 31 are in the shapes of convex arcs facing upward, positioned within the second slot 16, and well aligned. The pins 33 extend out of the bottom surface of the upper base 15 from a first side near the insert port 17 and a second side opposite to the insert port 17, respectively.

The circuit board 20 is positioned between the upper base 15 and the lower base 10 and formed with two rows of connection terminals 21 at a side opposite to the insert port 12. The pins 33 of the two rows of second terminals are electrically connected to the circuit board 20 and thus to the connection terminals 21 via traces on the circuit board 20.

According to the above-mentioned structure, when the card connector is mounted on a main board 23, the pins 28 of the two rows of first terminals 25 and the two rows of connection terminals 21 on the circuit board 20 are electrically connected to the main board 23. Thus, the two rows of second terminals 30 may be electrically connected to the main board 23 via the connection terminals 21.

In the conventional stacked card connector, a circuit board 20 is utilized to stack two bases, each of which having a single slot, into a dual-slot connector. However, due to the addition of the circuit board 20, the manufacturing processes are complicated and the cost may be greatly increased. That is, the cost of a circuit board has to be added. As to the complicated processes, the two rows of connection terminals 21 have to be bonded to the circuit board 20 in advance. Then, the two rows of second terminals 30 have to be bonded to the circuit board Finally, the upper base 15, the circuit board 20, and the lower base 10 have to be stacked.

SUMMARY OF THE INVENTION

An object of the invention is to provide a stacked card connector, in which the circuit board may be omitted and the manufacturing processes may be simplified, thereby reducing the manufacturing costs.

To achieve the above-mentioned object, the invention provides a stacked card connector comprising: a base formed with a first slot for receiving a first electric card and a second slot for receiving a second electric card, each of the first and second slots having an insert port, and the second slot being positioned above the first slot; a first row of spaced first terminals, each of the first row of spaced first terminals having a contact, an extension and a pin, the contacts being positioned within the first slot so as to elastically contact the inserted first electric card, the extensions connecting the contacts to the pins respectively and serving as elastic arms, and the pins extending out of a bottom surface of the base; and a first row of spaced second terminals, each of the first row of spaced second terminals having a contact, an extension and a pin, the contacts being positioned within the second slot so as to elastically contact the inserted second electric card, the extensions connecting the contacts to the pins respectively and serving as elastic arms, the pins extending out of the bottom surface of the base from a side opposite to the insert port of the second slot.

DETAILED DESCRIPTION OF THE INVENTION

Figure 1:
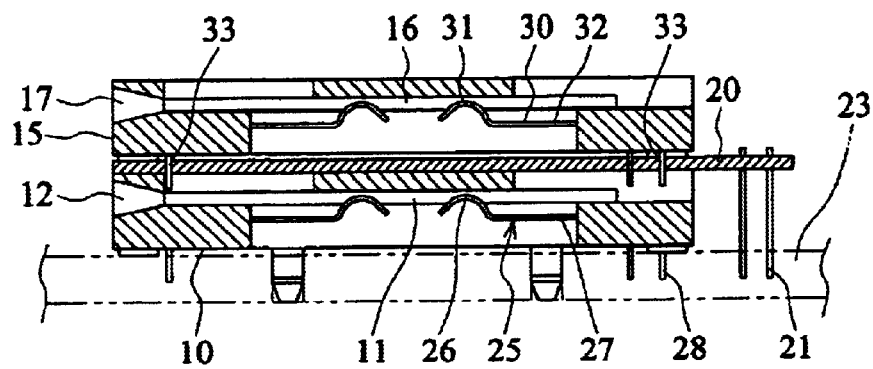
FIG. 1 is a cross-sectional view showing a conventional stacked card connector.
Figure 2:
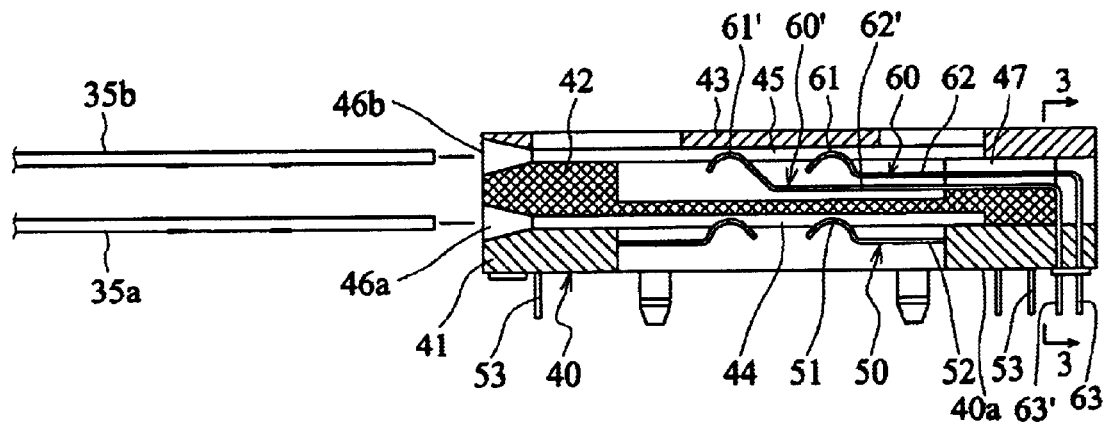
FIG. 2 is a cross-sectional view showing a stacked card connector according to a first embodiment of the invention.

Referring to FIG. 2, a stacked card connector according to a first embodiment of the invention includes a base 40, two rows of spaced first terminals 50, a row of spaced second rear terminals 60, and a row of spaced second front terminals 60'.

Figure 3:
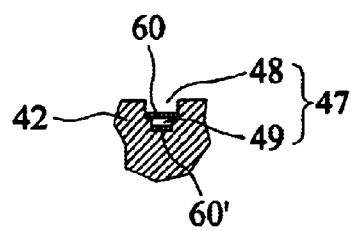
FIG. 3 is a cross-sectional view taken along a line 3—3 of FIG. 2.

The base 40 is composed of a bottom board 41, a middle board 42, and a top board 43, and is formed with a first slot 44 and a second slot 45 for receiving first and second electric cards 35a and 35b, respectively. The first slot 44 formed between the bottom board 41 and the middle board 42 has a first insert port 46a, and the second slot 45 formed between the middle board 42 and the top board 43 has a second insert port 46b. The second slot 45 is positioned above the first slot 44, and the first and second electrical cards 35a and 35b are inserted into the first and second insert Ports 46a and 46b alone the same direction, respectively. Referring to FIGS. 2 and 3, the middle board 42 is formed with spaced terminal slots 47 at a side opposite to the insert port 46a or 46b, and the terminal slot 47 has a shallower wide slot 48 and a deeper narrow slot 49.

Each first terminal 50 has a bottom arced contact 51, a bottom extension 52 and a bottom pin 53. The bottom arced contacts 51 of the two rows of first terminals 50 are in the shapes of convex arcs facing upward, positioned within the first slot 44, and well aligned. Therefore, the bottom arced contacts 51 may elastically contact the inserted first electric card 35a. The bottom extensions 52 for connecting the bottom arced contacts 51 to the bottom pins 53 serve as first elastic arms. The bottom pins 53 of the two rows of first terminals 50 extend out of the bottom board 41 or the bottom surface 40a of the base 40 from a first side near the first insert port 46a and a second side opposite to the first insert port 46a, respectively.

The second rear terminal 60 has a rear arced contact 61, a rear extension 62 and a rear pin 63. The second front terminal 60' has a front arced contact 61', a front extension 62' and a front pin 63'. The contacts 61 and 61' of the two rows of second terminals 60 and 60' are in the shapes of convex arcs facing upward, positioned within the second slot 45, and well aligned. Therefore, the rear and front arced contacts 61 and 61' positioned within the second slot 45 may elastically contact the inserted second electric card 35b, respectively. The rear and front extensions 62 and 62' for connecting the rear and front arced contacts 61 and 61' to the rear and front pins 63 and 63' serve as rear and front elastic arms, respectively. The rear and front pins 63 and 63' extend out of the bottom board 41 or the bottom surface 40a of the base 40 from a side opposite to the second insert port 46b, respectively. The rear extensions 62 of the second rear terminals 60 are higher than the front extensions 62' of the second front terminals 60' while the front pins 63' of the second front terminals 60' are in front of the rear pins 63 of the second rear terminals 60. Consequently, the two rows of second rear and front terminals 60 and 60', which are aligned, may be positioned within the wide slot 48 and the narrow slot 49 of the base 40, respectively.

Figure 4:
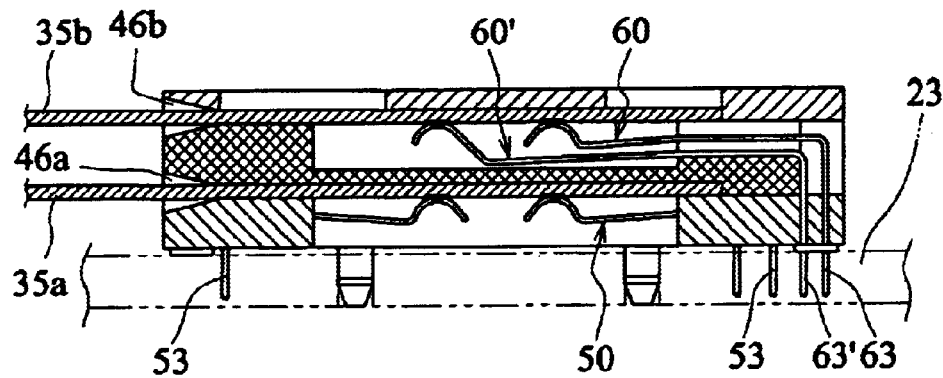
FIG. 4 is a cross-sectional view showing an operation state of the card connector according to the first embodiment of the invention.

Referring to FIG. 4, when the card connector of the invention is electrically connected to the main board 23, the pins 53 of the first terminals 50 and the pins 63 and 63' of the second terminals 60 and 60' may be directly inserted into the main board 23. After the electric card 35a or 35b is inserted, the main board may receive electrical signals from the electric card 35a or 35b.

Designing the second terminals 60 and 60' extending out of the bottom board 41 from a side opposite to the insert port 46b, the card connector of the invention may be directly electrically connected to the main board 23. Therefore, no additional circuit board has to be provided for signal transmission, thereby facilitating the manufacturing processes and greatly reducing the manufacturing costs accordingly.

Figure 5:
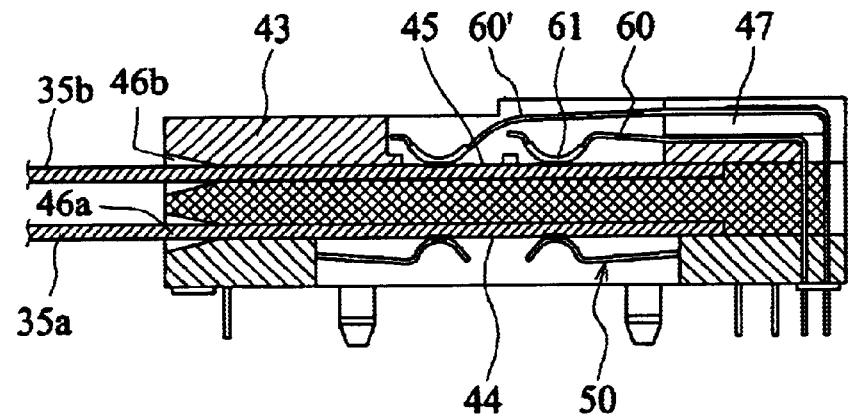
FIG. 5 is a cross-sectional view showing an operation state of the card connector according to a second embodiment of the invention.

As shown in FIG. 5, a card connector according to the second embodiment of the invention is almost the same as that in the first embodiment. The difference between the second and first embodiments resides in that the contacts 61 and 61' of the second terminals 60 and 60' within the second slot 45 are in the shapes of convex arcs facing downward. Consequently, two cards 35a and 35b have to be oppositely inserted into the first slot 44 and the second slot 45 for electrical connection, respectively. The second terminals 60 and 60' located at different heights are mounted within the terminal slots 47 of the top board 43, respectively.

Figure 6:
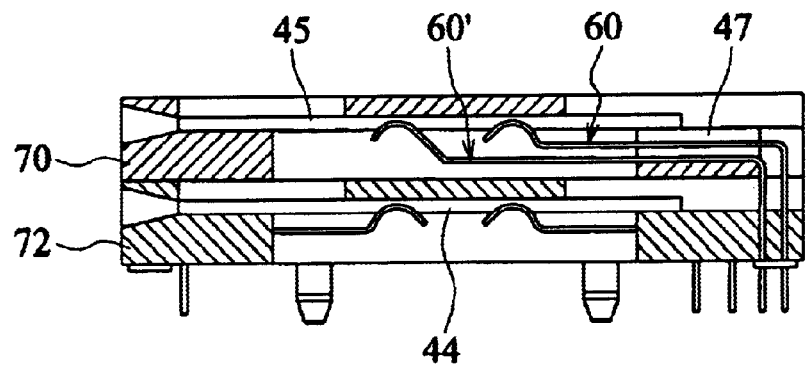
FIG. 6 is a cross-sectional view showing a card connector according to a third embodiment of the invention.

Referring to FIG. 6, a card connector according to the third embodiment of the invention includes a base composed of a lower base 72 and an upper base 70 stacked above the lower base 72. The upper and lower bases 70 and 72 are formed with a second slot 45 and first slot 44, respectively. The second terminals 60 and 60' positioned at different heights are mounted within the terminal slots 47 of the upper base 70, respectively.

Figure 7:
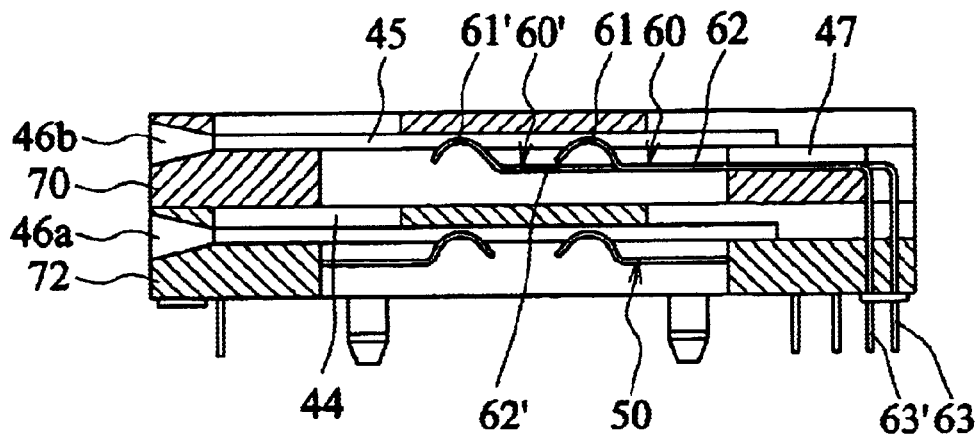
FIG. 7 is a cross-sectional view showing a card connector according to a fourth embodiment of the invention.
Figure 8:
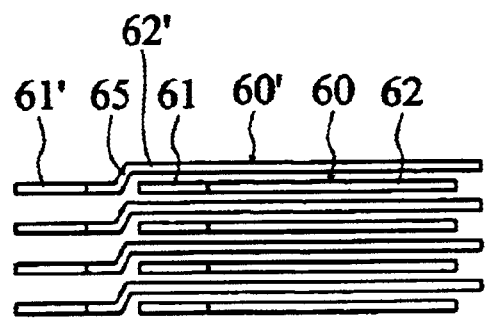
FIG. 8 is a top view showing the arrangement of the second terminals according to the fourth embodiment of the invention.

Referring to FIGS. 7 and 8, a card connector according to the fourth embodiment of the invention includes a base composed of a lower base 72 and an upper base 70 stacked above the lower base 72, which is the same as that of the third embodiment. The difference between the fourth and third embodiments resides in that the rear and front extensions 62 and 62' of the second rear and front terminals 60 and 60' are flush with each other, and the rear and front arced contacts 61 and 61' of the two rows of second rear and front terminals 60 and 60' are well aligned and flush with each other. According to such a design, it is not necessary for the terminal slots 47 of the upper base 70 to be designed as wide slots and narrow slots with different depths. However, the front extensions 62' of the second front terminals 60' have to form bends 65 so that the rear and front arced contacts 61 and 61' of the second rear and front terminals 60 and 60' may be aligned or flush with each other.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A stacked card connector, comprising:

a base formed with a first slot, which has a first insert port and may receive a first electric card, and a second slot, which has a second insert port and may receive a second electric card, the second slot being positioned over the first slot, and the first and second electrical cards being inserted into the first and second insert ports along the same direction, respectively;

a row of spaced first terminals, each of the first terminals having a bottom arced contact positioned within the first slot so as to elastically contact the inserted first electric card, a bottom pin extending out of a bottom surface of the base, and a bottom extension connecting the bottom arced contact to the bottom pin and serving as a first elastic arm;

a row of spaced second rear terminals, each of the second rear terminals having a rear arced contact positioned within the second slot so as to elastically contact the inserted second electric card, a rear pin extending out of the bottom surface of the base from a side opposite to the second insert port, and a rear extension connecting the rear arced contact to the rear pin and serving as a rear elastic arm; and a row of spaced second front terminals, each of the second front terminals having a front arced contact positioned within the second slot so as to elastically contact the inserted second electric card, a front pin extending out of the bottom surface of the base from the side opposite to the second insert port, and a front extension connecting the front arced contact to the front pin and serving as a front elastic arm, wherein the front extensions and the rear extensions are positioned at different levels, the front extensions are aligned with the rear extensions, respectively, the front arced contacts are flush with the rear arced contacts, and the front arced contacts are nearer to the second insert port than the rear arced contacts.

2. The stacked card connector according to claim 1, wherein the base is formed with spaced terminal slots at the side opposite to the second insert port, each of the terminal slots has a shallower wide slot and a deeper narrow slot, and the row of spaced second rear terminals and the row of spaced second front terminals are positioned within the wide and narrow slots, respectively.

3. The stacked card connector according to claim 1, wherein the base is composed of a bottom board, a middle board, and a top board, the first slot is formed between the bottom board and the middle board, and the second slot is formed between the middle board and the top board.

4. A stacked card connector, comprising:

- a base formed with a first slot, which has a first insert port and may receive a first electric card, and a second slot, which has a second insert port and may receive a second electric card, the second slot being positioned over the first slot, and the first and second electrical cards being inserted into the first and second insert ports along the same direction, respectively;
- a row of spaced first terminals, each of the first terminals having a bottom arced contact positioned within the first slot so as to elastically contact the inserted first electric card, a bottom pin extending out of a bottom surface of the base, and a bottom extension connecting the bottom arced contact to the bottom pin and serving as a first elastic arm;
- a row of spaced second rear terminals, each of the second rear terminals having a rear arced contact positioned within the second slot so as to elastically contact the inserted second electric card, a rear pin extending out of the bottom surface of the base from a side opposite to the second insert port, and a rear extension connecting the rear arced contact to the rear pin and serving as a rear elastic arm; and
- a row of spaced second front terminals, each of the second front terminals having a front arced contact positioned within the second slot so as to elastically contact the inserted second electric card, a front pin extending out of the bottom surface of the base from the side opposite to the second insert port, and a front extension connecting the front arced contact to the front pin and serving as a front elastic arm, wherein the front extensions are flush with the rear extensions, the front arced contacts are flush with the rear arced contacts, the front arced contacts are nearer to the second insert port than the rear arced contacts, and the front extensions are formed with bends so that the rear arced contacts and the front arced contacts are aligned, respectively.

5. The stacked card connector according to claim 4, wherein the base is composed of a bottom board, a middle board, and a top board, the first slot is formed between the bottom board and the middle board, and the second slot is formed between the middle board and the top board.

\* \* \* \* \*